US008088319B2

(12) United States Patent
De Winter et al.

(10) Patent No.: US 8,088,319 B2
(45) Date of Patent: Jan. 3, 2012

(54) METHOD TO PRODUCE A PANEL ASSEMBLY FOR USE IN A VEHICLE OPENING

(75) Inventors: Hugo De Winter, Wetteren (BE); Stijn Langie, Wetteren (BE); Gert Raeymackers, Wetteren (BE)

(73) Assignee: BASF SE, Ludwigshafen (DE)

( * ) Notice: Subject to any disclaimer, the term of this patent is extended or adjusted under 35 U.S.C. 154(b) by 1445 days.

(21) Appl. No.: 10/599,078

(22) PCT Filed: Mar. 17, 2005

(86) PCT No.: PCT/EP2005/051232
§ 371 (c)(1),
(2), (4) Date: Sep. 19, 2006

(87) PCT Pub. No.: WO2005/090058
PCT Pub. Date: Sep. 29, 2005

(65) Prior Publication Data
US 2007/0186496 A1    Aug. 16, 2007

(30) Foreign Application Priority Data
Mar. 19, 2004   (EP) .................................. 04447070

(51) Int. Cl.
*B29C 41/20* (2006.01)
(52) U.S. Cl. ........ 264/252; 264/261; 264/263; 264/275; 264/309
(58) Field of Classification Search .................. None
See application file for complete search history.

(56) References Cited

U.S. PATENT DOCUMENTS

| | | | |
|---|---|---|---|
| 4,915,395 A | | 4/1990 | Barteck |
| 5,362,428 A | | 11/1994 | Tsujino et al. |
| 5,421,940 A | | 6/1995 | Cornils et al. |
| 5,464,575 A | * | 11/1995 | Jaffiol et al. ................. 264/443 |
| 5,489,409 A | * | 2/1996 | Koganezawa et al. ........ 264/167 |
| 5,645,785 A | * | 7/1997 | Cornils et al. ................ 264/252 |
| 5,662,996 A | | 9/1997 | Jourquin et al. |
| 5,908,595 A | * | 6/1999 | Cornils et al. ................ 264/252 |
| 6,071,619 A | | 6/2000 | De Winter et al. |
| RE37,341 E | * | 8/2001 | Cornils et al. ................ 264/252 |
| 6,709,614 B1 | | 3/2004 | Kreye |
| 2003/0180498 A1 | | 9/2003 | De Winter et al. |

FOREIGN PATENT DOCUMENTS

DE    34 18 163 A1   11/1985
(Continued)

OTHER PUBLICATIONS

Patent Abstracts of Japan, Vo. 1996, No. 11, Nov. 29, 1996 & JP 08 192084 (Toyoda Gosei Co., Ltd), Jul. 30, 1996.

*Primary Examiner* — Edmund H. Lee
(74) *Attorney, Agent, or Firm* — Oblon, Spivak, McClelland, Maier & Neustadt, L.L.P.

(57) ABSTRACT

A method for producing a panel assembly is provided. The panel assembly includes a panel and a gasket adhered to the panel and extending along at least a portion of the periphery. A curable composition is applied either directly or indirectly onto the panel and onto a mold surface onto which the panel has been positioned. When being applied on the mold surface, the curable composition has a dynamic viscosity which is lower than the dynamic viscosity of extrusion materials. In this way, a better surface quality can be achieved without having to exert a high pressure onto the curable composition. In contrast to the known RIM processes, the curable composition is not injected in a closed mold but is applied onto an open mold surface by means of an applicator device moving along at least the portion of the periphery of the panel.

26 Claims, 8 Drawing Sheets

FOREIGN PATENT DOCUMENTS

| | | |
|---|---|---|
| DE | 4103047 A1 | 8/1992 |
| EP | 303 305 A2 | 2/1989 |
| EP | 431 534 A3 | 6/1991 |
| EP | 585 167 B1 | 8/1993 |
| GB | 1 426 906 | 3/1976 |
| JP | 04226309 * | 8/1992 |
| JP | 04226321 * | 8/1992 |
| JP | 2000117806 * | 4/2000 |
| WO | WO 96/14979 A1 | 5/1996 |

\* cited by examiner

METHOD TO PRODUCE A PANEL ASSEMBLY FOR USE IN A VEHICLE OPENING

The present invention relates to a method to produce a panel assembly, in particular a panel assembly for use in a vehicle opening, comprising a panel and a gasket, which is adhered to the panel, extends along at least a portion of the periphery thereof and has a surface, at least a portion of which is moulded against a solid surface, the method comprising the steps of:

provyding a mould having at least one mould surface;

placing the panel and the mould surface against one another;

applying a curable composition for producing said gasket directly or indirectly onto the mould surface and directly or indirectly onto said panel, the curable composition having a dynamic viscosity, measured at a shear rate of 1/s, lower than 100 000 mPa·s when it arrives onto at least a portion of the mould surface;

allowing the applied curable composition to cure against said solid surface, formed at least by said panel and by said mould surface, to produce the gasket; and removing the panel and the gasket produced thereon from the mould.

The panel is usually a window panel arranged to be mounted in a car body. In order to mount the window panel in a car body, it is provided with a gasket extending along the periphery of the pane. In the currently known methods, this gasket is produced directly onto the window panel, either by an extrusion or by an injection moulding process.

In the extrusion process, a profiled strand of a reacting polymer system or of a thermoplastic polymer is extruded and deposited onto the edge of the window panel by means of a calibrated nozzle guided by means of an automatic handling device. The reacting polymer system or the thermoplastic material is applied in a pasty or kneadable state, i.e. in a highly viscous state, so that it retains its shape when being applied on the window panel instead of flowing out. According to U.S. Pat. No. 5,362,428 the extruded synthetic resin should have a viscosity in the range of 300 000 to 10 000 000 mPa·s (=cP), and more preferably in the range of 600 000 to 3 000 000 mPa·s (at a shear rate of 1/s) in order to enable to form the synthetic resin into a specified shape or to keep the specified shape until the extruded synthetic resin is cured. An advantage of the extrusion process is that it involves much lower tool costs than the injection moulding process but it has a number of drawbacks. First of all the seam location between the start and the end of the extruded profiled strand must be finished afterwards in an additional process step. Secondly, the extruded strand has a constant cross-sectional profile. Thirdly, it is not possible to extrude around sharp corners so that, at the location of such corners, also an additional finishing step is required. Moreover, the surface of an extruded gasket has only a modest quality.

In order to obtain a window assembly with a gasket of a high dimensional accuracy, U.S. Pat. No. 5,421,940 discloses to extrude a thermoplastic polymer onto the periphery of the window panel and onto an open mould surface extending beyond the periphery of the window panel. A difference with the other extrusion processes is that only a portion of the surface of the thermoplastic material is shaped by the extrusion nozzle, the other part of this surface being moulded against the mould surface. Since the thermoplastic material is partially shaped by the extrusion nozzle, it still should have a quite high viscosity to retain its shape. A drawback of the method disclosed in U.S. Pat. No. 5,421,940 is therefore that the thermoplastic material has to be applied with a sufficiently high pressure onto the mould surface in order to shape the viscous thermoplastic material against the mould surface and against the edge of the panel. In order to be able to apply the required pressure onto the thermoplastic material in the mould, the extrusion nozzle has to be pressed quite strongly against the upper side of the glass panel. In the embodiment illustrated in FIG. 5 of abovementioned patent, wherein not only the front but also the back of the gasket is moulded against the mould surface, the extrusion nozzle has moreover even to fit exactly in the gap between the mould surface and the upper surface of the glass panel. It is clear that the risk on glass breakage is increased by the pressure exerted by the extrusion nozzle onto the glass panel.

Another drawback of the method disclosed in U.S. Pat. No. 5,421,940 is that the pressure which can be exerted onto the thermoplastic material in the mould, is limited since the material is not injected into a completely closed mould. Consequently, compared to an injection moulding process, the surface quality will be worse. Especially when the mould surface shows a fine texture, the thermoplastic material may be too viscous to take over this texture. Moreover, air bubbles may remain present at the interface between the mould surface and the thermoplastic material. In order to guarantee that the surface of the mould shall be completely wetted with the thermoplastic polymer, U.S. Pat. No. 5,421,940 teaches to heat the mould. However, the mould is only heated to a temperature lower than the temperature of the extruded thermoplastic polymer so that the polymer still remains highly viscous. Moreover, by heating the mould, the production cycle time is increased since the polymer must be allowed to set before the window assembly can be removed from the mould.

In a reaction injection moulding (RIM) process, a curable composition is injected under pressure in a closed mould cavity formed around the periphery of the window panel. An advantage of such a RIM process is that low viscous curable compositions may be used (see for example WO 98/14492 disclosing preferred viscosities of polyol and isocyanate blends of between 150 and 2500 mPa·s at application temperature). Advantages of such an injection moulding process are the better surface quality of the gaskets (mainly due to the much lower viscosity of the injected reactive mixture) and the larger design freedom. Important drawbacks of an injection moulding process are however the high tooling costs and also the time and effort needed to make and modify the injection moulds (either when the mould surface is damaged or when a new design is needed). The moulds have indeed to be made of a robust material in order to withstand the relatively high temperature and pressure of the process. This appears for example from EP-B-0 355 209 which discloses to replace the elastomeric seals between the mould surface and the glass pane by a metal ring since elastomeric seals have the disadvantage of imperfect parting lines due to the fact that they tend to deform when too much pressure is exerted thereon. Moreover, a very accurate milling of the mould is needed to avoid glass breakage during mould closure and to finetune contact area between the mould surface and the window panel, so that leakage of the injected material is prevented. These high tooling costs usually impose limits on the production capacity of a RIM process. A further drawback of a RIM process is that an external release agent has to be applied onto the mould surface. This not only involves an extra process step (longer cycle time) but also causes surface defects on the gasket, such as a too low gloss of a high gloss gasket, due to accumulation of this release agent in the mould. Another drawback of a RIM process is finally that the mould cavity has to show a minimum height so that it can be filled completely, i.e. substantially without voids, with the curable composition.

U.S. Pat. No. 6,228,305 discloses still another process to produce a gasket on the periphery of a window panel. to In accordance with this process, a window panel is positioned on a lower mould section. Subsequently, a highly viscous adhesive is applied (extruded) onto the edge of the window panel and a highly viscous foam material onto the mould surface which extends along the edge of the window panel. Before the adhesive and the foaming material are completely cured, a pressure is exerted onto the adhesive and onto the foaming material by lowering an upper mould section onto the lower mould section in order to mould the adhesive and the foaming material into the desired form. Due to the fact that the foam material and the adhesive are highly viscous, a considerable pressure will be exerted on the foam material and onto the window panel. A drawback of the method disclosed in U.S. Pat. No. 6,228,305 is therefore that the mould has to be made again of a robust material resulting in the same drawbacks as mentioned hereabove for a RIM process (in particular high tooling costs, risk on glass breakage, . . . ). Moreover, due to the high viscosity of the moulding materials, and the fact that they even will have an increased viscosity when the required pressure is exerted onto the moulding material, the surface quality will not be as good as the surface quality of injection moulded articles, especially not when a fine surface texture has to be taken over from the mould surface.

In view of the drawbacks of the prior art processes, it is the object of the present invention to provide a new method to produce a panel assembly which enables a higher design freedom and a better surface quality of the gasket than obtained by the common extrusion process, without involving however tooling costs which are as high as for RIM process. More particularly, the new method should allow varying the cross-sectional profile of the gasket along the periphery of the panel without requiring very costly moulds.

To this end, the method according to the invention is a moulding method wherein the curable composition has a dynamic viscosity lower than 100 000 mPa·s (at a shear rate of 1/s) when arriving onto at least a portion of the mould surface. In contrast to the known injection moulding process wherein such less viscous curable compositions are used, the curable composition is not injected in a closed mould but it is applied, either directly or indirectly, on the panel and the mould surface by means of an applicator device moving along the periphery of the panel while applying the curable composition.

Since the curable composition has a lower viscosity than the polymers used in the known extrusion processes, a better surface quality can be achieved without having to exert high pressures onto the curable composition. In particular, it is possible to take over the surface quality of polished moulds (glossy surface), of structured moulds (for example sandblasted mould surfaces) or of textured moulds (showing for example a leather texture). Due to the fact that the curable composition is applied by means of a moving applicator device, the curable composition can be applied in an open mould.

In a preferred embodiment of the invention, the curable composition is also cured in an open mould or in a mould which is not completely filled with the curable composition. In other words, when curing the curable composition, the solid surface against which the gasket is produced, preferably only partially surrounds this gasket so that said portion of the surface of the gasket is allowed to cure in contact with said solid surface while a further portion of the surface of the gasket is simultaneously allowed to cure in contact with a gas.

According to the invention it has been found that it is not necessary to use a closed mould (such as for example in a RIM process) to mould the less viscous curable compositions into the desired shape, but that a quite large variety of shapes can also be achieved by applying the curable compositions by means of a moving applicator device in an open mould. Compared to the use of a closed mould, the use of an open mould offers considerable advantages. First of all, there is no risk of glass breakage during closing of the mould, and no finetuning of the mould sections is needed to prevent leakage of the applied material. Moreover, substantially no pressure or only very little pressure is needed to apply and to mould the curable composition against the solid surface.

In a further preferred embodiment of the method according to the invention, the curable composition is applied and allowed to cure until the gasket is produced (i.e. until it can be demoulded substantially without causing a permanent deformation of the gasket) more particularly without exerting a pressure onto the mould surface which is higher than 500 mbar, preferably without exerting a pressure onto the mould surface which is higher than 350 mbar, more preferably without exerting a pressure onto the mould surface which is higher than 150 mbar and most preferably without generating a pressure onto the mould surface which is higher than 50 mbar.

As a result of such low pressures, the panel does not have to be pressed with a great pressure onto the mould surface to avoid flash formation and the mould surface does not have to be made of a robust material, such as metal. Instead, it can be made of a softer material, such as for example a silicone material. An advantage of such a softer material is that an effective sealing is achieved between the mould surface and the panel without having to provide separate seals on the mould surface. Moreover, some soft materials such as silicones do not adhere to the gasket so that no external release agent has to be applied. Finally, it is much easier to make mould surfaces of a softer material than for example of metal so that the moulds will not only be less expensive but the design thereof can be changed more easily. Silicone moulds can be produced for example in a mother mould. In this way, damaged moulds can be replaced at little expense and it is also possible, without excessive costs, to provide more moulds in order to increase the production capacity. In view of the resilient properties of the mould surface, the mother mould has not to be made as accurately as the RIM moulds used in the prior art methods.

In the method according to the invention the curable composition can be applied onto the mould surface, either directly or indirectly, and onto the panel, either directly or indirectly. Applying the curable composition directly onto the mould surface or onto the panel means that the curable composition leaving the applicator device arrives directly onto the mould surface respectively the panel. Applying the curable composition indirectly onto the mould surface or onto the panel means that the curable composition leaving the applicator device first arrives on a portion of the solid surface against which the gasket is to be produced (for example only onto the panel or onto the mould surface or optionally onto an insert) and is subsequently further spread out in order to cover the entire solid surface against which the gasket is to be produced. To spread the curable composition so that it covers the entire solid surface onto which the gasket is to be produced, the curable composition can be allowed to flow out over this surface. Alternatively, or preferably additionally, the curable composition can contain a blowing agent and the curable composition is allowed to foam on the surface onto which it is applied so that the curable composition is spread to cover the entire solid surface onto which the gasket is produced.

In the method according to the invention, the curable composition can thus be applied by means of the applicator device initially only onto the panel or onto an insert and can subsequently be allowed to flow out onto and over the mould surface. When arriving onto the mould surface, i.e. when being applied onto a first portion thereof, the curable composition has to show the lower viscosity required by the present invention. When further covering the mould surface, the viscosity may already have been increased to a higher value due to curing of the curable composition, especially when a non-visible portion of the surface of the gasket is produced against this further portion of the mould surface. In a preferred embodiment, the viscosity of the curable composition remains however below the upper limits of the present invention until covering of the mould surface with the curable composition is complete.

In a preferred embodiment of the method according to the invention, the curable composition is spread out over a larger area or a larger width before being applied onto the solid surface against which the gasket has to be produced, so that it can be applied (by one or more passes of the applicator device) substantially onto the entire solid surface which has to be covered with the curable composition. The curable composition can be spread out either in the applicator device itself and/or after it has left the applicator device by spraying it according to a spray pattern diverging in one or more directions.

By spreading out the curable composition before it arrives onto the solid surface onto which the gasket is to be produced, the curable composition can be applied in one or more relatively thin layers whilst still covering this total solid surface, i.e. the total contact area between the gasket on the one hand, and the panel, the mould surface and any solid inserts, on the other hand. In this way, surface defects on the surface of the gasket can be avoided more easily. Moreover, it has been found that, notwithstanding the fact that no mould surface is provided for moulding the back of the gasket, the thickness of the gasket (measured in a direction perpendicular to the large faces of the panel) can be limited, especially when the solid surface onto which the gasket is to be produced shows a relatively pronounced relief or relatively large height differences. Indeed, when applying one or more relatively thin layers, the backside of the gasket does not have to be flat but may follow in great outline the front side defined by the mould surface and the surface of the panel. In this respect, the curable composition is preferably applied in at least one layer having an average thickness smaller than 3 mm, preferably smaller than 2 mm, more preferably smaller than 1.5 mm, and most preferably smaller than 1 mm.

The present invention also relates to a panel assembly, as described hereinbefore and which is characterised in that it is obtained by the method according to the invention. The gasket on the panel of the panel assembly according to the invention has more particularly a surface, a portion of which is moulded against a solid surface whilst a second portion of which is produced in contact with a gas.

Other particularities and advantages of the invention will become apparent from the following description of some particular embodiments of the method and the panel assembly according to the present invention. The reference numerals used in this description relate to the annexed drawings wherein.

Figure 1:
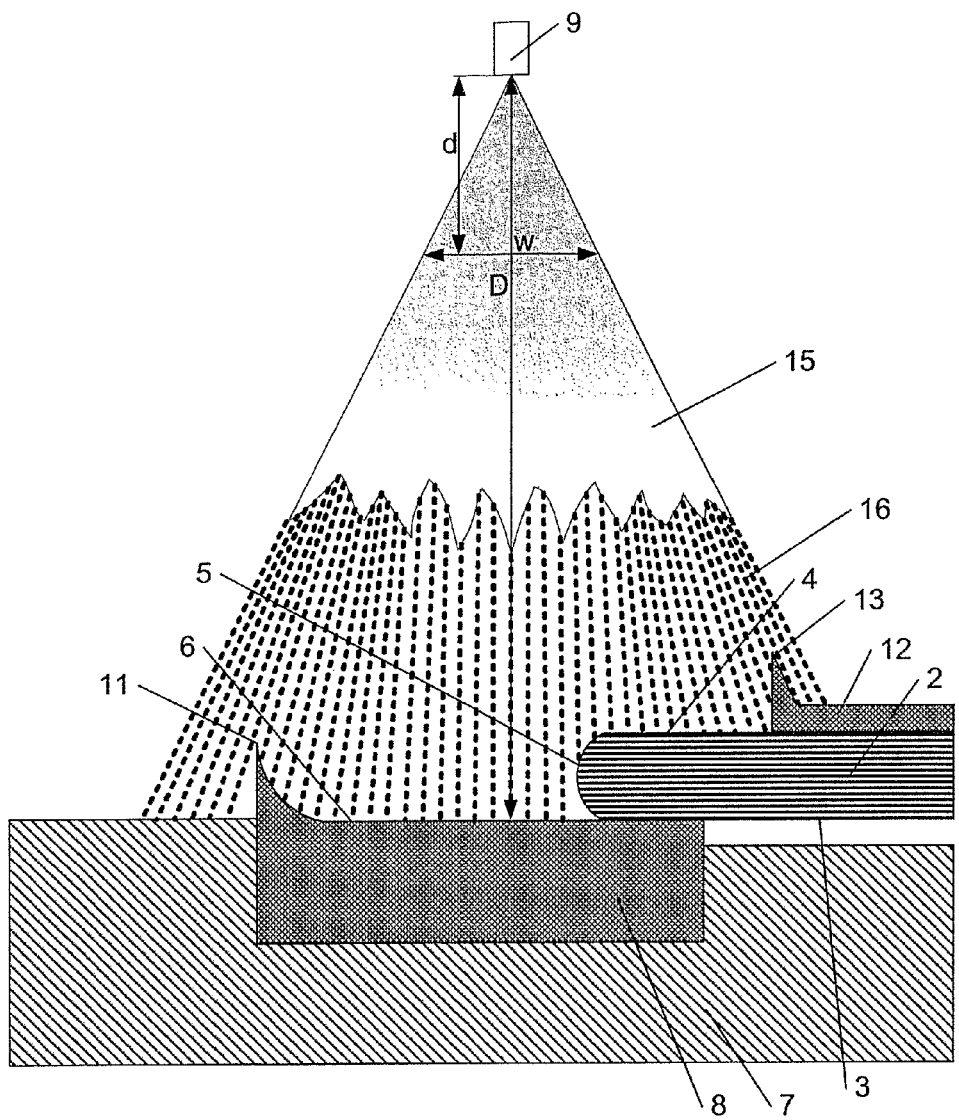
FIGS. 1 to 3 illustrate schematically a first method according to the invention wherein a gasket is produced by two successive spraying steps on the edge of a glass panel.
Figure 2:
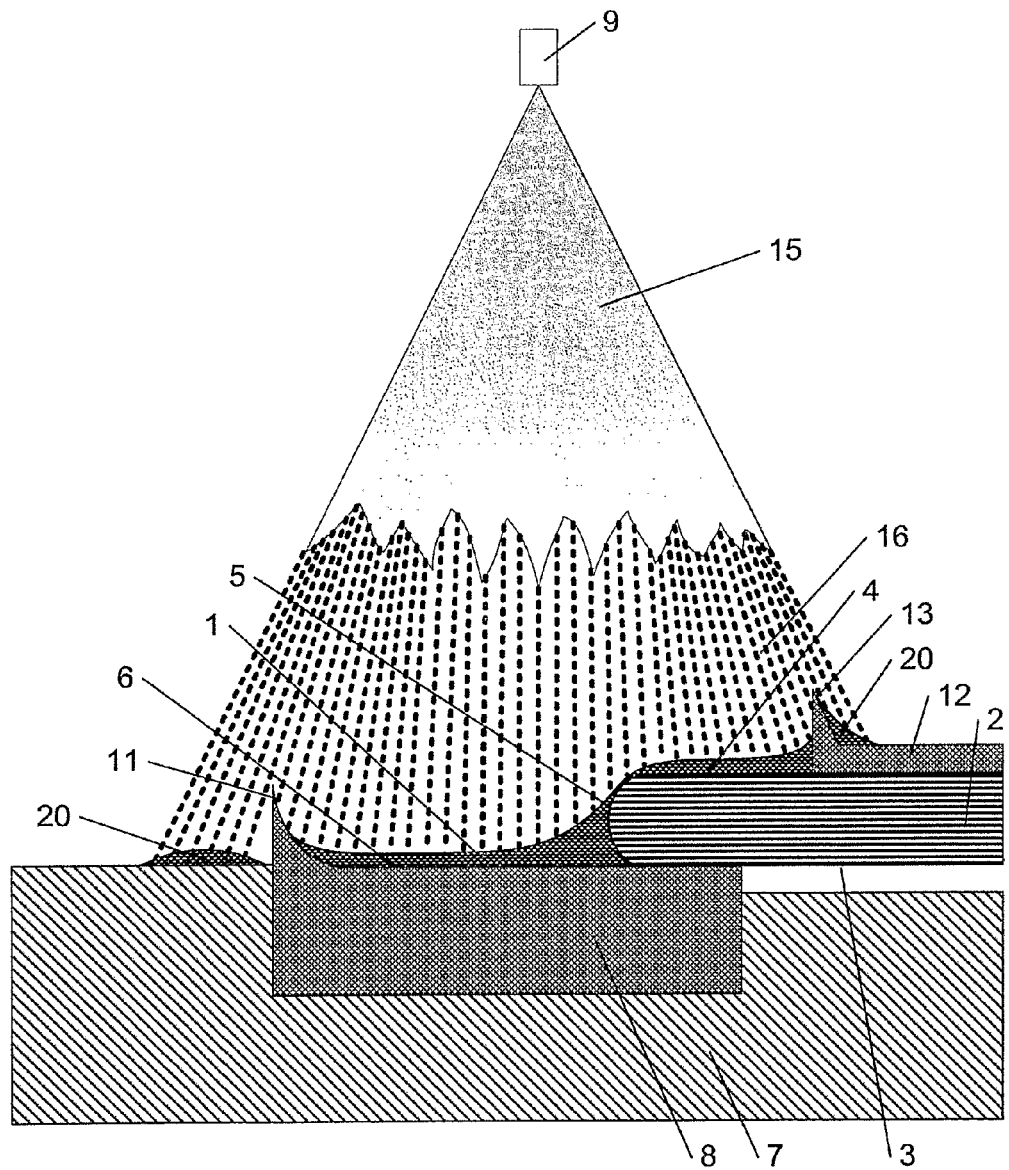
Figure 3:
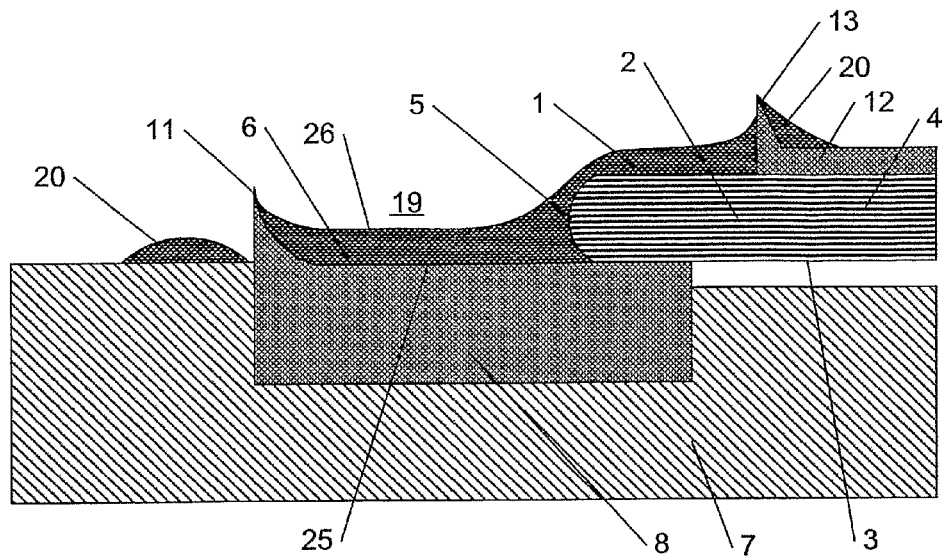

In the method illustrated in FIGS. 1 to 3 a gasket 1 is provided by means of a spray process onto a glass panel 2, in particular a glass pane arranged to be mounted in a vehicle opening. The gasket 1 adheres to a portion of the panel 2 and extends along at least a portion of the periphery thereof. Instead of providing the gasket on a glass panel, it is also possible to apply it on other types of panels such as on sheet metal or on synthetic panels such as polycarbonate panels, or on solar panels. Moreover, the panel may comprise some finishing elements applied onto the edge thereof, such as for example a moulding or a paint layer on the back of the panel or a strip on the front side of the panel. Such a strip may be adhered to the actual panel prior to producing the gasket or can be adhered to the panel by means of the gasket itself. When it is in contact with the panel, it is to be considered as a part of the panel. An essential feature of the gasket produced in accordance with the present invention is that it has a surface, at least a portion of which is moulded against a solid surface, formed not only by the panel (and any insert) but also by a mould surface. The gasket forms in particular an edge moulding which acts as a means for closing or covering the gap between the panel and the edge of the opening wherein the panel is to be mounted. Consequently, in a top plan view, seen in a direction perpendicular to the major faces of the panel, the gasket has generally a smaller surface area than the panel.

The glass panel 2 has a first and a second major face 3, 4 and a peripheral edge face 5. In the illustrated embodiment, the glass panel 2 is placed with its first major face 3 onto the surface 6 of an open mould so that a portion of the mould surface 6 projects beyond the peripheral edge face 5 of the panel. In this way a gasket, in particular an encapsulation, having a high dimensional accuracy, will be formed around at least a portion of the periphery of the panel 2 thus enabling a perfect continuity between the panel assembly and the car body. Before placing the panel 2 against the mould surface, it is preferably cleaned and primed to enhance the adherence of the gasket to the panel.

The mould surface 6 of the mould is formed by a resilient part 8 that is received in a groove in a metal support part 7. The mould surface 6 is flush with the first major surface 3 of the glass panel 2. However, it is clear that it is for example also possible to shape the mould surface so that it has a recessed portion situated in front of the first major surface of the glass panel. In this way the gasket will extend partially over the first major face 3 of the glass panel 2.

In order to make the gasket 1, the portion of the surface 4, 5 of the panel 2 and the mould surface 6 onto which the gasket is to be produced, is covered with a curable composition. The curable composition is cured and the panel and the gasket produced thereon are removed from the mould. In the method according to the invention, the curable composition is applied by means of an applicator device 9 moving along at least said portion of the periphery of the panel 2. The curable composition is preferably applied by means of the applicator device directly both onto the mould surface and onto the panel. However, it is also possible to apply the curable composition by means of the applicator device only directly onto the mould surface or onto the panel (or possibly onto an insert positioned on the mould surface or on the panel) and subsequently indirectly onto the remaining part of the solid surface which is to be covered with the curable composition. In the latter case, the curable composition has to spread out further onto the mould surface and/or onto the surface of the panel in order to cover the entire solid surface against which the gasket will be produced.

The curable composition may either be a non-thixotropic (Newtonian) or a thixotropic (non-Newtonian) material or liquid. In order to be able to obtain a good surface quality without having to exert a too high pressure onto the curable composition applied onto the mould surface, the curable composition has a dynamic viscosity, measured at a shear rate of 1/s, lower than 100 000 mPa·s, preferably lower than 75 000 mPa·s, more preferably lower than 35 000 mPa·s and most preferably lower than 10 000 mPa·s when applying it on at least a portion of the mould surface (for Newtonian liquids, the dynamic viscosity is not dependent of the shear rate and can be determined in accordance with ASTM D445-03). The lower the viscosity, the better the surface quality will be. In this respect, when arriving onto the mould surface, i.e. when covering a first portion of the mould surface, the curable composition has a dynamic viscosity which is preferably even lower than 10 000 mPa·s, more preferably even lower than 5 000 mPa·s and most preferably even lower than 2 000 mPa·s. In order to achieve such viscosities, a suitable formulation can first of all be selected for the curable composition. Moreover, the dynamic viscosity of a particular formulation can be lowered by increasing the temperature of the curable composition. The curable composition can be applied for example at room temperature. However, in order to speed up the curing reaction, the curable composition can also be applied at a higher temperature, for example at 65° C., either onto a non-heated surface or onto a surface heated to for example 45° C. When the curable composition is applied directly onto the entire mould surface, it has the required lower viscosity when being applied onto the entire mould surface. When it is applied first on a first portion of the mould surface, and subsequently spread over the entire mould surface, it may have a larger viscosity when being spread on the last portion of the mould surface (due to the curing reaction). This last portion of the mould surface is preferably on a non-visible side of the gasket. However, the curable composition has preferably also a viscosity below the above-defined upper limits when being applied onto the last portion of the mould surface.

In the method according to the invention use is preferably made of a mould having such a shape that the solid surface against which the gasket is cured or produced only partially surrounds the gasket in a cross-sectional view thereof, so that a first portion 25 of the surface of the gasket is cured in contact with the mould surface and the panel whilst a second portion 26 of the surface of the gasket is cured in contact with a gas 19. This gas 19 will usually be formed by the air surrounding an open mould but could also be formed by air or another gas contained in an enclosure surrounding for example the entire mould or only the periphery of the panel onto which the gasket is to be produced. Compared to the known injection moulding process, wherein a curable composition is injected in a closed mould, no or at least considerably less pressure is exerted onto the curable composition in the mould. In this way less robust mould materials can be used and an effective seal can be obtained more easily between the mould surface and the surface of the panel, even for little viscous curable compositions.

In a particular embodiment of the method according to the invention, the curable composition is applied by means of the applicator device directly on the mould surface 6 and onto the surface of the panel 2 and is spread from a predetermined distance D (which does not have to be constant) over the mould surface 6 and a portion of the panel 2. In this way, the entire with of the solid surface can be covered with a layer of the curable composition preferably by at the most three, more preferably by at the most two passes of the applicator device, and most preferably by one single passage of the applicator device.

In the embodiment illustrated in FIGS. 1 to 3, the curable composition is applied by means of a spray nozzle 9 that spreads or scatters a pressurised flow of the curable composition. When spraying the curable composition, it preferably has a dynamic viscosity lower than 10 000 mPa·s, more preferably lower than 5 000 mPa·s, and most preferably lower than 2 000 mPa·s (at a shear rate of 1/s) so that it can be scattered more easily into fine droplets. When spraying the curable composition, it is preferably sprayed out of the nozzle according to a spray pattern, of which at least one cross-sectional dimension W increases towards said solid surface. It more particularly increases over a distance d from the applicator device with at least 0.05×d, and preferably with at least 0.1×d. In the embodiment illustrated in FIGS. 1 to 3, the curable composition is sprayed in accordance with a conical spray pattern so that the cross-section thereof increases in two dimensions. However, flat spray patterns are also possible.

Figure 5:
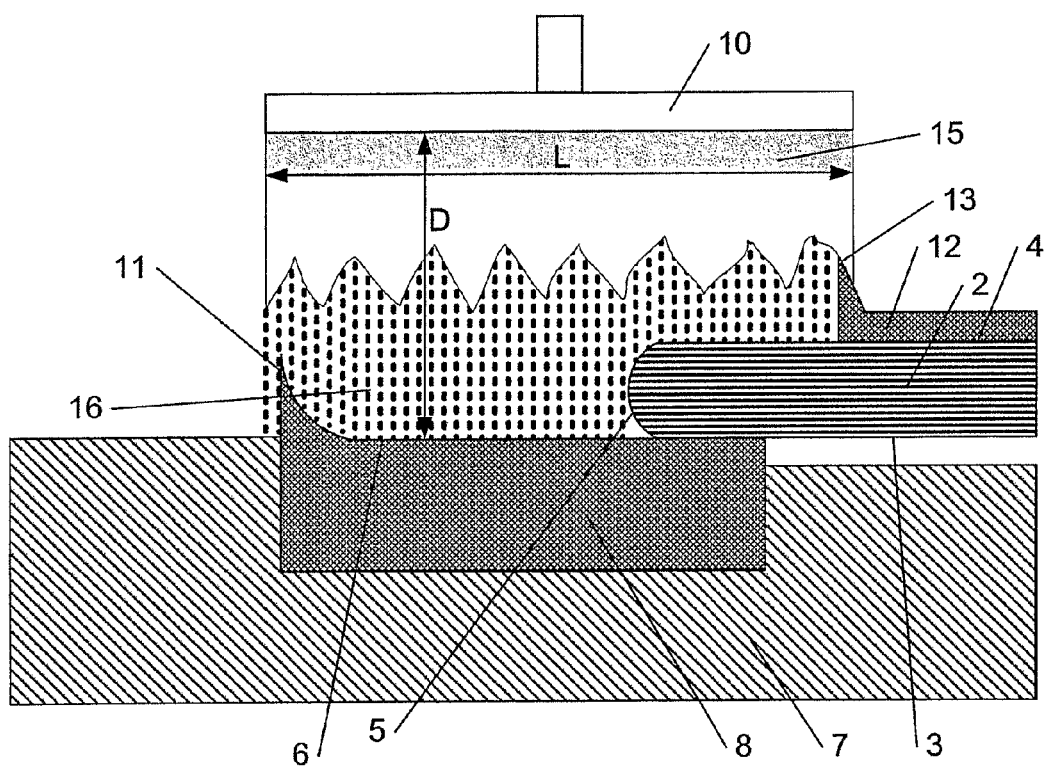
FIGS. 5 and 6 are similar to FIG. 1 but illustrate a different way of spreading the curable composition over the edge of the glass panel and over the mould surface.
Figure 6:
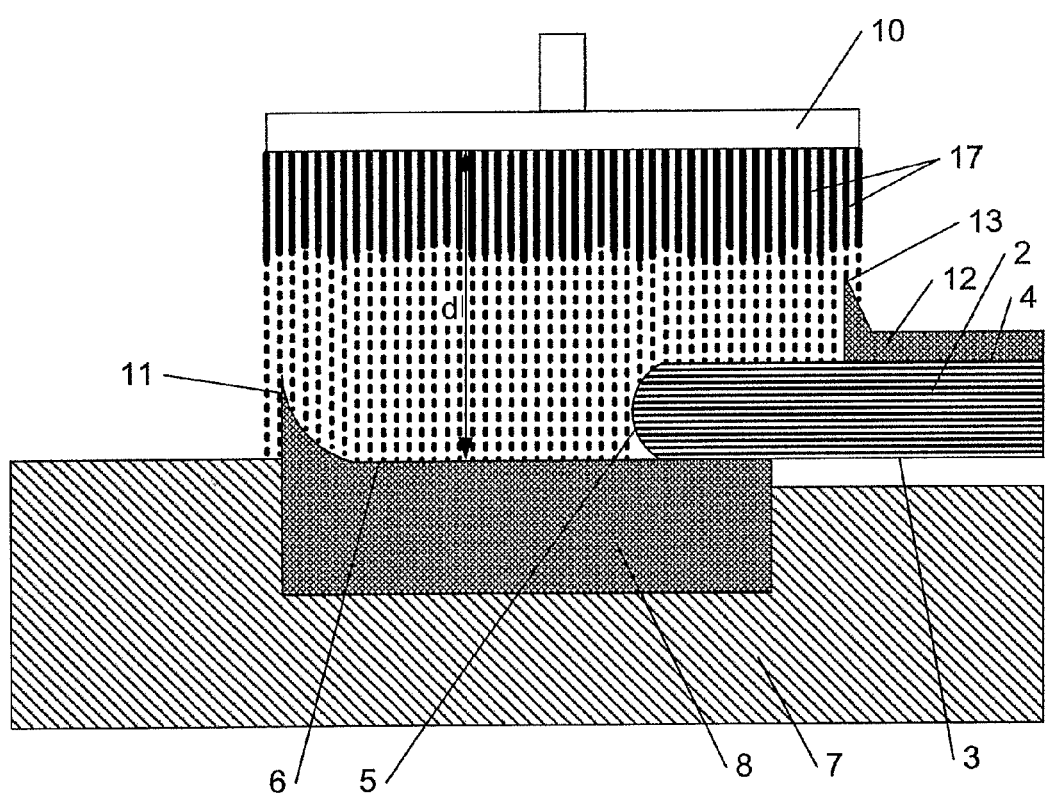

Instead of using one spray nozzle, the curable composition can be spread out of two or more spray nozzles. Moreover, instead of spraying the curable composition so that it is spread out over a larger surface area, it can also be poured or sprayed by means of an applicator device wherein the curable composition is spread by dividing it in the applicator device itself into at least two, preferably at least three, individual streams leaving the applicator device through separate openings. Additionally, or alternatively, the curable composition can also be spread in one or more elongated outlet openings having a smallest and a largest cross-sectional dimension L, the largest cross-sectional dimension L being greater than three times the smallest cross-sectional dimension, preferably greater than five times the smallest cross-sectional dimension and more preferably greater than ten times the smallest cross-sectional dimension. The largest cross-sectional dimension and/or the number of openings may be so great that the curable composition leaving the spreading device does not have to be spread further to cover the entire surface. As illustrated in FIG. 5 such an applicator device may comprise for example a tube 10 provided with a slit so that the curable composition is poured or sprayed in the form of a film 15 or a curtain of droplets 16. FIG. 6 illustrates a further applicator device wherein the tube 10 is provided with a row of openings through which individual streams or jets 17 of the curable composition are applied onto the mould surface and the panel. The individual streams or jets 17 cover the entire surface (either by one or by more passes of the spreading device) without forming however a continuous film due to the fact that the curable composition flows out on the mould and panel surface to form a continuous layer thereon. Since the curable composition will usually be a rather viscous liquid, it will normally have to be applied under pressure by means of the applicator device.

The curable composition comprises preferably a polyurethane reaction mixture, for example a polyurethane reaction mixture as disclosed for example in EP-B-0 379 246 (which is taken up herein by way of reference) comprising a polyol and an isocyanate component. The curable composition is preferably formulated to produce an elastomeric polyurethane material having a density higher than 400 kg/m$^3$, and preferably higher than 500 kg/m$^3$. Lower densities are however also possible. In particular it is possible to add a blowing agent, or a larger amount of blowing agent, so that a foam will be produced having in particular a density lower than 400 kg/m$^3$, and more particularly lower than 250 kg/m$^3$. Suitable nozzles for spraying the curable polyurethane composition are disclosed for example in EP-B-0 303 305 and EP-B-0 389 014 (which are also taken up herein by way of reference). The nozzles disclosed in these European patents generate a conical spray pattern. However, in the method according to the invention use can also be made of nozzles generating for example a flat spray pattern.

The curable composition can be sprayed in such a manner that it reaches the surface of the mould and the panel in the form of a film 15 and/or in the form of droplets 16. It is preferably sprayed at a sufficiently low pressure so that it leaves the spray nozzle in the form of a film 15 that, after a predetermined spray distance, is divided into droplets 16 (see FIG. 1). As illustrated in FIG. 5, a film 15 that falls apart into droplets 16 can also be achieved by means of other spreading devices, such as a spreading device comprising an elongated slit through which the curable composition is preferably released under some pressure. Depending on the distance D from which the curable composition is applied, it thus reaches the mould and/or panel surface in the form of a film 15 and/or in the form of droplets 16. The film 15 has preferably a thickness smaller than 2 mm, and more preferably smaller than 1 mm, to enable to apply thin layers. The distance D from which the curable composition is applied is preferably greater than 10 mm, and more preferably greater than 20 mm.

In the method illustrated in FIGS. 1 to 3 two successive layers are sprayed onto the mould and the panel surface. As can be seen in FIG. 2 only a relatively thin layer is formed on the edge of the glass panel between the second major face 4 and the peripheral edge face 5. By means of a second spraying step, a sufficiently thick layer can however also be obtained at that location (see FIG. 3) without having to fill the mould completely so that the gasket has no flat top or back side but follows in great outline the mould and panel surface. In this respect, the layers of the curable composition preferably have an average thickness smaller than 3 mm, more preferably smaller than 2 mm, and most preferably smaller than 1.5 mm or even smaller than 1 mm. Small layer thicknesses are moreover advantageous because they enable to produce gaskets, especially lips, having a small thickness (in particular even smaller than the minimum thicknesses that can be achieved by a RIM process). Moreover, a better surface quality can be achieved since for example pinholes are easier to avoid. By average thickness is meant in the present specification the volume of curable composition applied onto the mould surface and onto the panel divided by the surface area of the solid surface (including the contact area between the curable composition and the mould surface, the panel and any insert) against which the gasket is produced (not taking into account any overspray 20 area or volume).

In order to be able to produce the gasket 1 by a limited number of passes of the spraying or spreading device, the layer or layers into which the curable composition is applied, preferably have an average thickness larger than 0.1 mm, more preferably larger than 0.25 mm, and most preferably larger than 0.4 mm.

In the method according to the invention the curable composition is preferably applied and allowed to cure without exerting a pressure onto the mould surface which is higher than 300 mbar, more preferably without generating a pressure onto the mould surface which is higher than 150 mbar, most preferably without generating a pressure onto the mould surface which is higher than 50 mbar and in particular even substantially without generating a pressure onto the mould surface. An important advantage of such low pressures is that the mould surface 6 may be made at least partially, but preferably substantially entirely, of a resilient material having in particular a shore A hardness smaller than 90, and preferably smaller than 60. The mould surface 6, or more particularly the resilient mould part 8, can thus for example be made of a silicone material. This can be done easily by moulding this part 8 in a mother mould. Due to the resilient nature of the silicone mould part 8, the mother mould doesn't have to be milled very accurately and doesn't have to be fine-tuned so that it is less expensive to be made. A further advantage of the soft mould part 8, in particular of the silicon mould part 8, is that an effective sealing can be achieved between the mould surface 6 and the surface of the panel so that no flashes have to be removed.

Preferably, the mould part 8 is made of a self-release material to which the curable composition does not adhere so that no external release agent has to be applied. An example of such a self-release material are the soft silicone materials described hereabove. Other examples are materials like polytetrafluoroethylene (PTFE).

At the edge of the mould surface 6 opposite the glass panel 2, the mould surface 6 is preferably provided with a cutting edge 11. Due to the sharp top of this edge (curvature radius preferably smaller than 1 mm), no or only a limited amount of curable composition remains on the top of this edge so that no cutting step is required to separate any over-spray 20 on the mould surface from the gasket 1.

As illustrated in FIGS. 1 to 3, a mask 12 is preferably applied onto the panel, more particularly onto the second major face 4 thereof. After having applied the curable composition, this mask is removed from the panel. The mask 12 is also preferably provided with a cutting edge 13 so that again no finishing step is required to separate any over-spray 20 on the mask from the polymeric material of the gasket 1. The mask 12 can easily be made by moulding from a same material as the resilient mould part 8, in particular from a silicone material.

Figure 4:
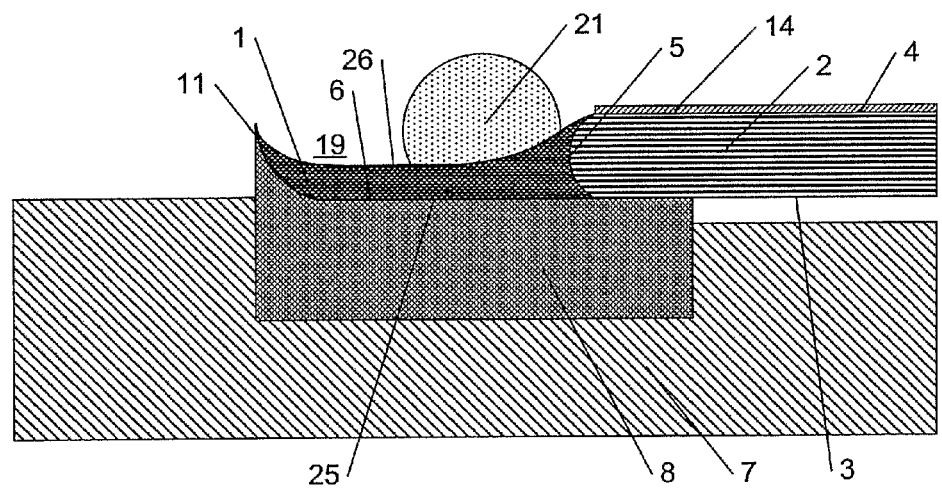
FIG. 4 shows a different design of a gasket that can be produced, by one pass of the applicator device, onto the edge of the glass panel.

FIG. 4 illustrates a variant embodiment of the gasket 1 that can be obtained by the method according to the invention. In this embodiment the front side of the gasket is still flush with the first major face 3 of the glass panel 2 but it does no longer extend up to the second major face 4 of the panel 2. In fact, it is only adhered to the peripheral edge face 5 of the panel 2. Such a design is much easier to be obtained with the method according to the present invention than with a RIM process, since in view of the small contact area between the gasket and the peripheral face, there is a real risk that in a RIM process the gasket will be released from the panel when the mould is opened and the panel assembly is removed from the mould. In the method according to the present invention, a one-sided encapsulation on the peripheral edge of the panel is however preferred in view of the material savings that can be achieved. Another advantage of this one-sided encapsulation is that the transparent surface area of the glass pane is maintained as large as possible.

In the embodiment of FIG. 4, the second major face 4 of the panel 2 can easily be masked by means of a tape or a foil 14 extending exactly to the peripheral edge of the panel 2. The foil that usually covers the major faces of a glass panel to protect it against scratches during transport and handling, can for example directly be used as mask, so that no additional step or no additional material is needed to provide the mask. The one-sided encapsulation illustrated in FIG. 4 offers further the advantage that no sharp edges have to be covered with the curable composition. Consequently, for this embodiment it will be easier to apply the curable composition for the gasket in only one layer, i.e. by one pass of the applicator device.

Figure 7A:
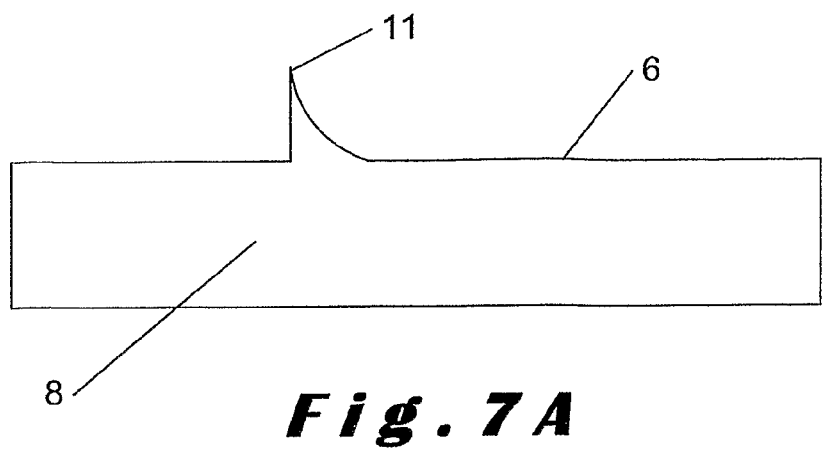
FIGS. 7A to 7C illustrate variant mould surfaces that can be used in the methods illustrated in the previous figures.
Figure 7B:
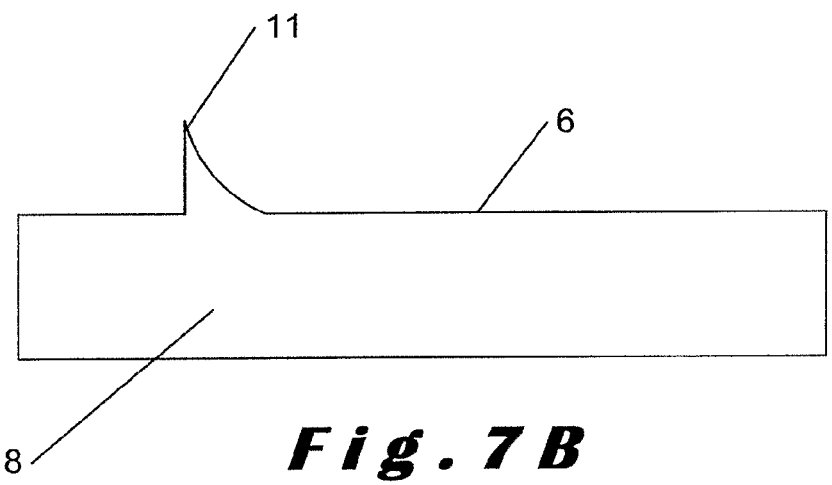
Figure 7C:
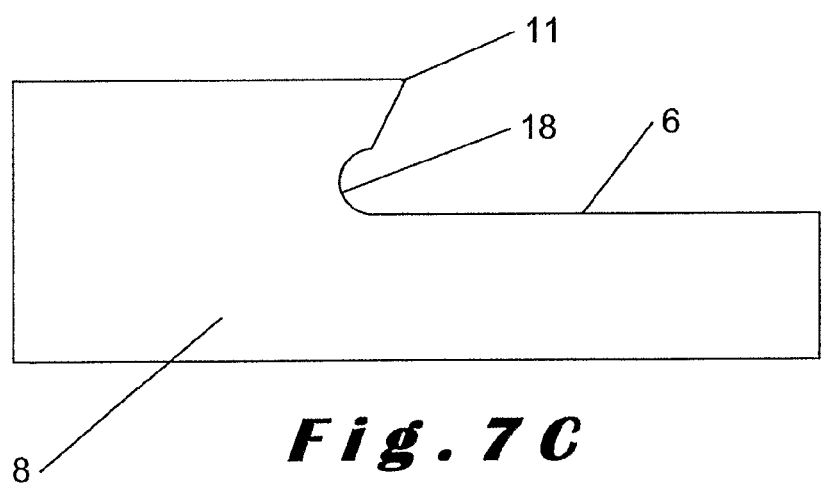

FIGS. 7A to 7C illustrate possible different designs of the resilient silicone mould part 8. As can be seen in FIGS. 7A and 7B the location of the cutting edge 11 can be varied easily along the length of the mould part 8 so that the gasket projects over a varying distance beyond the edge of the glass panel. In FIG. 7C an alternative design of the mould surface 6 is illustrated. Underneath the cutting edge 11, the mould surface 6 extends in this embodiment beyond this cutting edge 11. In this way, the free edge of the gasket will be of a very high dimensional accuracy and will provide a reference, based on which the window assembly can be accurately mounted in the car body. In order to enable to spray more of the curable composition in the undercut 18 underneath the cutting edge 11, the spray nozzle 9 can be turned in that direction. Of course, the spray nozzle 9 can also be directed towards the glass panel 2 when more curable composition has to be sprayed underneath the glass panel (for example when the polymeric has to extend also over a portion of the first major face 3 of the panel 2). If undercuts are present on both sides, the spray nozzle can be directed during a first pass towards one side and during a second pass towards the opposite side. During both passes, the spray pattern does not have to cover the entire width of the mould and panel surface that is to be covered.

Figure 8:
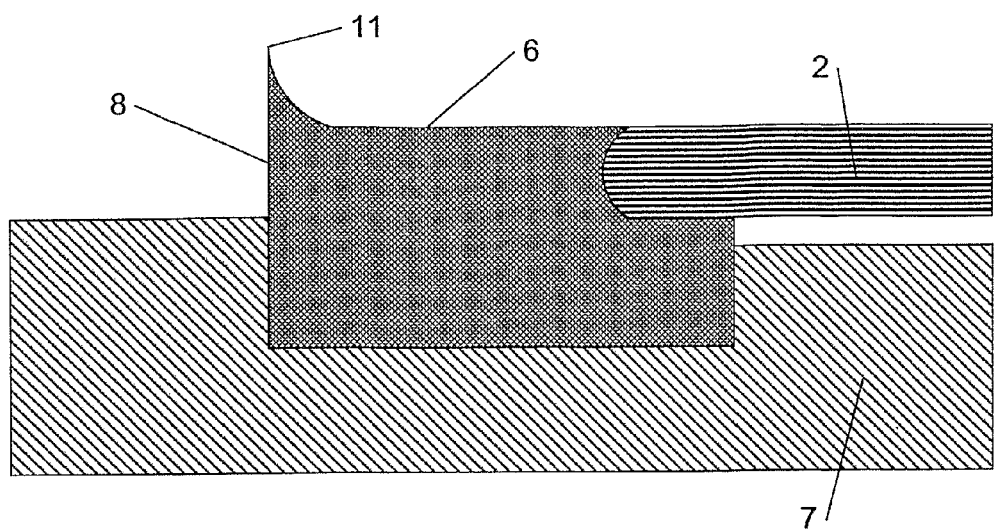
FIG. 8 illustrates a variant design of the mould surface.

FIG. 8 shows a further design of the resilient mould part 8. The illustrated resilient mould part 8 abuts not only the first major face 3 of the panel 2 but also the peripheral edge face 5 thereof. The gasket produced on the mould surface and the panel thus forms a one-sided encapsulation on the second major face 4 which projects beyond the edge of the panel.

In order to achieve a light stable gasket, the gasket can be made of the light stable curable aliphatic polyurethane compositions disclosed in EP-B-0 379 246. However, a light stable gasket can also be achieved by means of an aromatic polyurethane composition by covering it with a light stable layer. This layer can be an in-mold paint, in particular a water- or solvent-based paint, or a layer of a curable aliphatic polyurethane composition.

When mounted in a vehicle opening, the gasket obtained by the method described hereinbefore may act as a seal against the car body. However, often it will not act as a seal but it is only intended to provide an aesthetic transition, i.e. a perfect continuity, between the window assembly and the car body. Since the window assembly is usually glued to the car body, a seal between the glass panel and the car body is not necessary. However, when such a seal is desired, a flexible foam can be applied on the back side of the gasket and/or onto the glass panel to fill the gap between the window assembly and the car body. Such a flexible foam can be glued onto the gasket and/or onto the panel or it can be produced thereon in situ, for example by casting or extruding a foamable polyurethane composition onto the back of the gasket and allowing it to foam to produce the seal 21 (see FIG. 4). Since no external release agent is applied onto this back, a good adhesion can be obtained. The flexible foam has preferably a density lower than 400 kg/m$^3$, more preferably lower than 250 kg/m$^3$ and most preferably lower than 150 kg/m$^3$.

The gasket obtained in the method according to the invention does not necessarily extend around the entire periphery of the panel. In case it does, no additional process step is required to finish any seams between the start and end locations or at the location of sharp corners. When spraying the curable composition from a distance onto the mould surface, the spray nozzle can follow the periphery of the panel, but preferably moves along each of the sides of the panel and moves forward when arriving at the corners, with the spraying being preferably interrupted when arriving at or having passed the corner. After having been moved to the correct position to spray the next side of the panel (or to spray a second layer of curable composition onto the previously sprayed side) spraying is started again and the spray nozzle is moved along the next side. At the corners, some overlapping may occur but this causes no practical problems since the front of the gasket remains of the same quality and there will usually be a gap between the gasket and the car body. Moreover, the gasket will usually be somewhat compressible.

Figure 9:
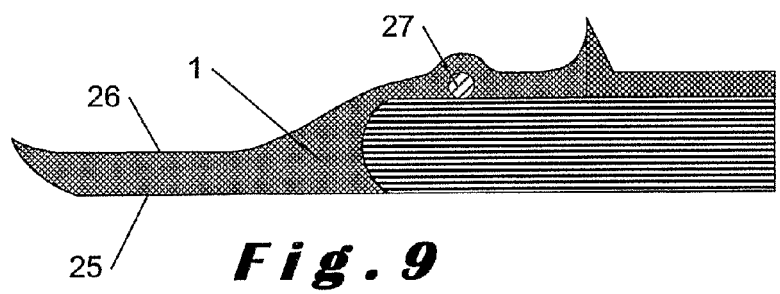
FIGS. 9 to 11 illustrate a gasket adhered to a glass panel and containing an insert.
Figure 10:
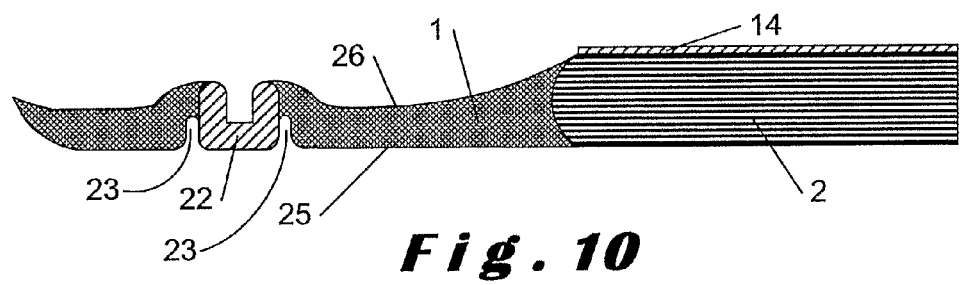

In the method according to the present invention, different types of inserts can be moulded in the gasket. Examples of such inserts are electrical wires, a mirror support, alarm sensors, switches, "Einfassrahmen", water deflectors, etc. FIG. 9 illustrates for example an electrical wire 27 which was placed onto the panel before applying the curable composition so that it is embedded therein. The insert could also be positioned onto the mould surface, preferably after having applied a first layer of the curable composition thereon so that the insert is entirely embedded in the gasket and so that it will not be visible. As illustrated in FIG. 10, an insert, more particularly an aesthetic strip 22, can also be positioned on the mould surface so that it remains visible. The strip 22 can be clamped between upstanding edges on the mould surface so that a groove 23 is formed along both edges of the strip. In the method according to the invention, penetration of curable composition between the front side of the strip and the mould surface can be avoided quite easily. Indeed, no or substantially no pressure is exerted onto the curable composition. Moreover, the mould surface can be made of a resilient material providing an effective seal. Additionally, upstanding edges can be provided on the mould surface, which may also be made of the same soft resilient material so that even rigid inserts can easily be clamped between such edges.

Figure 11:
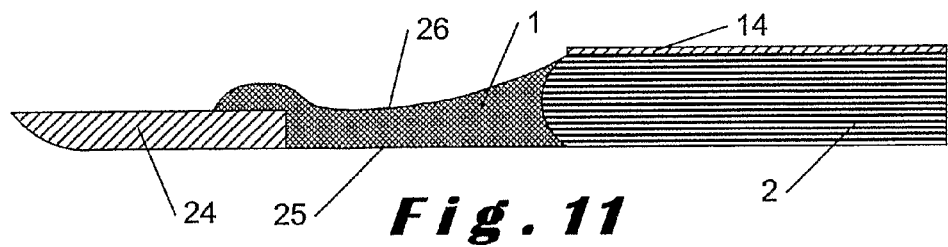

FIG. 11 shows an embodiment wherein the insert comprises a pre-manufactured lip 24 which forms the free edge of the encapsulation. This lip 24 may show properties different from the properties of the gasket. It may for example be softer to provide a seal against the car body.

Figure 12:
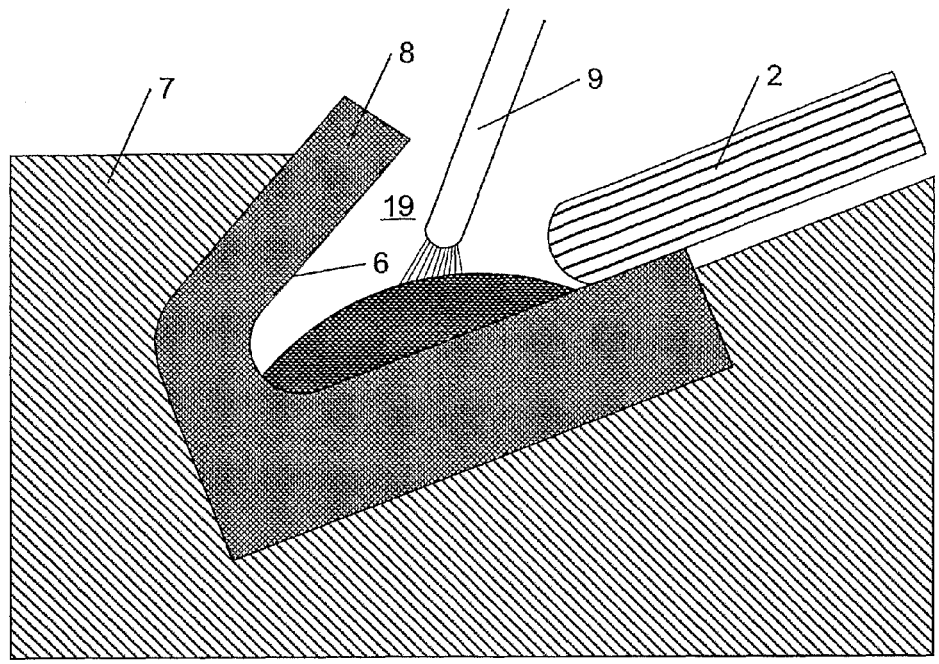
FIGS. 12 to 13 illustrate a further method according to the invention wherein the curable composition foams to produce the gasket.
Figure 13:
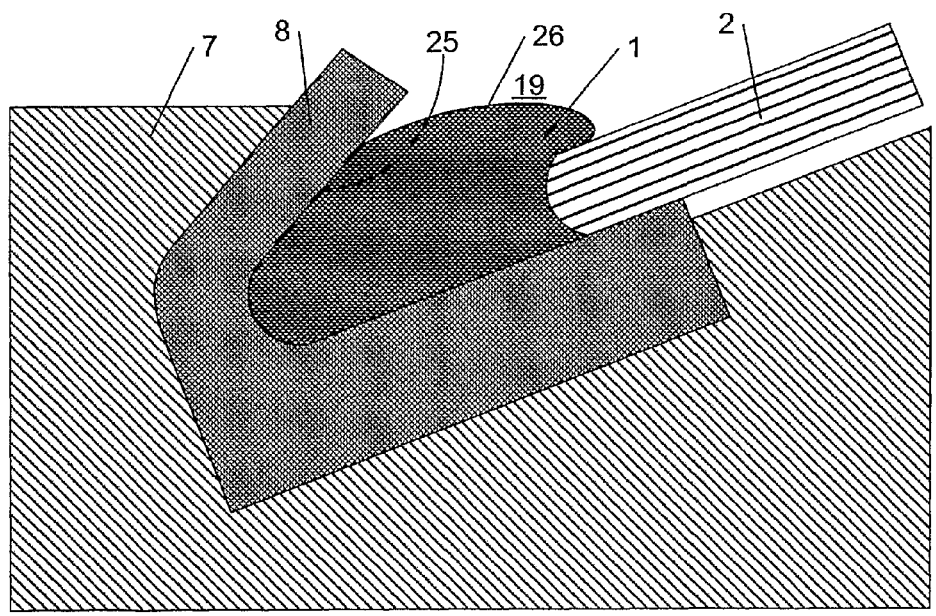

FIGS. 12 and 13 illustrate a particular embodiment of the method according to the invention wherein use is made of a curable composition which comprises a blowing agent so that a foam is produced. The foamable composition is poured in a first step, illustrated in FIG. 12, onto the mould surface 6. During this pouring step, the curable composition flows somewhat out over the mould surface and starts to foam. As illustrated in FIG. 13, the mould surface 6 and the edge of the panel 2 are not only covered due to the fact that the curable composition flows out, but especially also due to the fact that the volume of the curable composition increases as a result of the foaming reaction. Since the foaming reaction is performed in an open mould, substantially no pressure is generated therein.

The invention claimed is:

1. A method to produce a panel assembly for use in a vehicle opening, comprising a panel and a gasket, which gasket is adhered to the panel, extends along at least a portion of the periphery thereof and has a surface, at least a portion of which is moulded against a solid surface, the method comprising:
    providing a mould having at least one mould surface;
    placing the panel and the mould surface against one another;
    applying a composition for producing said gasket, by means of an applicator device moving along at least said portion of the periphery of the panel while applying the composition in the mould, directly or indirectly on the mould surface and directly or indirectly onto said panel;
    producing the gasket from said composition against said solid surface, formed at least by said panel and by said mould surface; and
    removing the panel and the gasket produced thereon from the mould,
    wherein said composition is a curable composition which is allowed to cure against said solid surface to produce the gasket and which has a dynamic viscosity, measured at a shear rate of 1/s, lower than 35000 mPa·s when it arrives onto at least a portion of the mould surface.

2. A method according to claim 1, wherein the curable composition is applied and allowed to cure until the gasket is produced without exerting a pressure onto the mould surface which is higher than 500 mbar.

3. A method according to claim 1, wherein, when curing the curable composition, said solid surface only partially surrounds the gasket so that said portion of the surface of the gasket is allowed to cure in contact with said solid surface while a further portion of the surface of the polymeric is simultaneously allowed to cure in contact with a gas until the gasket is produced.

4. A method according to claim 1, wherein, when arriving onto said portion of the mould surface, the dynamic viscosity of the curable composition is lower 10000 mPa·s.

5. A method according to claim 1, wherein said curable composition is applied by means of said applicator device directly onto said mould surface and also directly onto said panel.

6. A method according to claim 1, wherein the applicator device is maintained at a distance from said solid surface when applying the curable composition thereon, and the curable composition is sprayed by means of the applicator device onto said solid surface.

7. A method according to claim 6, wherein the curable composition is sprayed in accordance with a spray pattern, at least one cross-sectional dimension of which increases towards said solid surface, said at least one cross-sectional dimension increasing over a distance d from the applicator device with at least 0.05×d.

8. A method according to claim 6, wherein the distance from which the curable composition is sprayed is greater than 10 mm.

9. A method according to claim 6, wherein the curable composition is sprayed in the form of a film and/or in the form of droplets onto said solid surface.

10. A method according to claim 9, wherein said film has a thickness smaller than 2 mm.

11. A method according to claim 1, wherein the curable composition is applied in at least one layer onto said solid surface, which layer has an average thickness smaller than 5 mm.

12. A method according to claim 1, wherein the curable composition is applied in at least one layer onto said solid surface, which layer has an average thickness larger than 0.1 mm.

13. A method according to claim 1, wherein said mould surface is formed at least partially by a resilient material having a shore A hardness smaller than 90, said resilient material being a moulded silicone material.

14. A method according to claim 1, wherein said mould surface is formed by a self-release material requiring no coating of a release agent to enable to remove the gasket from the mould surface, and the self-release material is a silicone material or PTFE.

15. A method according to claim 1, wherein the panel has a first and a second major face and a peripheral edge face and the panel and the mould surface are placed against one another in such a manner that said mould surface engages the first major face of the panel and has a portion which projects beyond the peripheral edge face thereof.

16. A method according to claim 15, wherein a cutting edge is provided on said portion of the mould surface which projects beyond the peripheral edge face of the panel, said cutting edge forming a first edge of the gasket.

17. A method according to claim 15, wherein the second major face of the panel is provided with a mask which is removed after having applied the curable composition and which forms a second edge of the gasket.

18. A method according to claim 17, wherein said mask is formed by a foil or a tape which is releasably adhered to the second major face of the panel and which extends substantially to the peripheral edge face of the panel.

19. A method according to claim 1, wherein, before applying said curable composition, an in-mold paint is first applied at least onto said mould surface.

20. A method according to claim 1, wherein said curable composition is applied in at least two layers.

21. A method according to claim 20, wherein said curable composition comprises a first curable composition, which is used to apply a first layer, and a further curable composition, which is used to apply a further layer on top of the first layer, and the further curable composition is an aromatic reactive polyurethane mixture.

22. A method according to claim 1, wherein after having produced the gasket, a flexible foam arranged to form a seal is applied on a back side of the gasket and/or on the panel, the flexible foam having a density lower than 400 kg/m$^3$.

23. A method according to claim 1, wherein said curable composition comprises a polyurethane reaction mixture formulated to produce an elastomeric polyurethane material having a density higher than 400 kg/m$^3$.

24. A method according to claim 1, wherein said curable composition is formulated to produce a foam, having a density lower than 400 kg/m$^3$, the curable composition comprising a blowing agent and the curable composition being allowed to foam on said solid surface to produce the polymeric foam.

25. A method according to claim 1, wherein an insert is fixed to the panel by covering the insert at least partially with the curable composition when applying the curable composition to produce the gasket.

26. A method according to claim 1, wherein said applying step comprises the step of allowing the curable composition to flow out over said solid surface.

* * * * *